Dec. 2, 1930.  L. S. WILBUR  1,783,351
SPLICE BAR OR FISH PLATE
Filed June 24, 1929
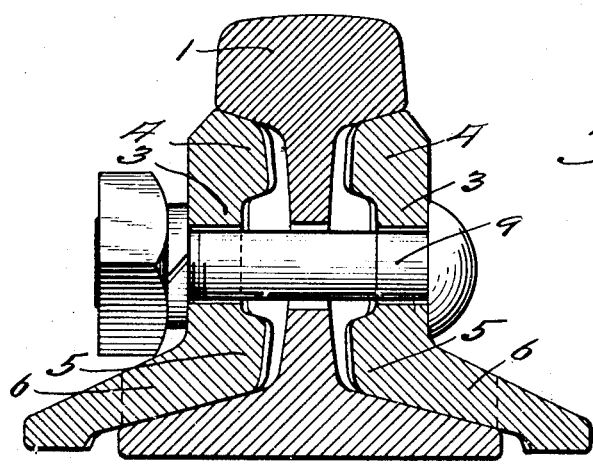
Fig. 1.
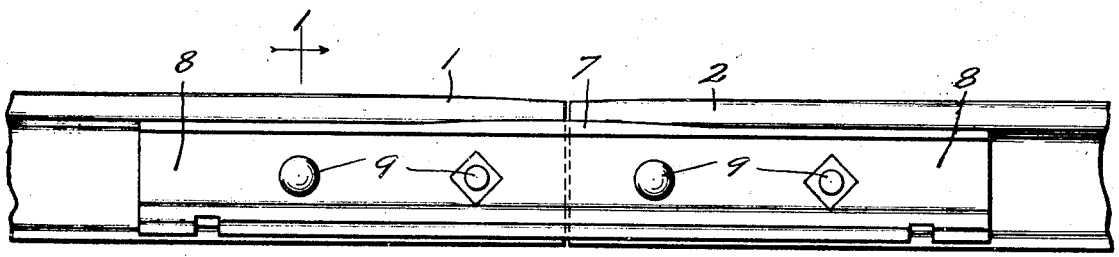
Fig. 2.
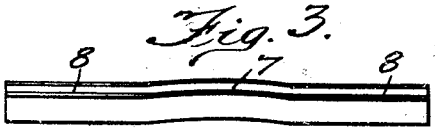 Fig. 4.    Fig. 3.
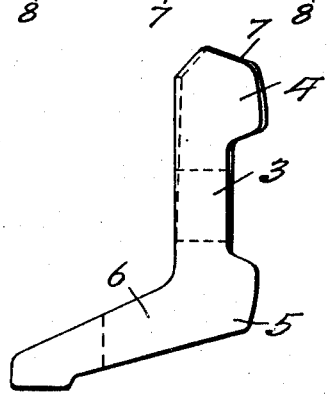 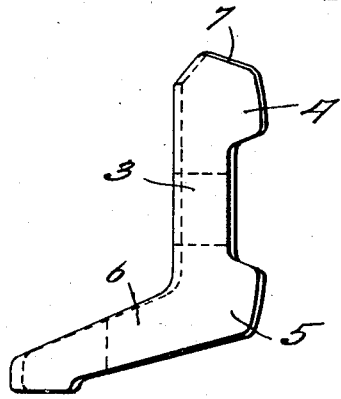 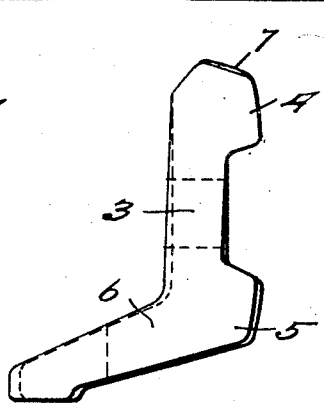
Fig. 6.   Fig. 5.   Fig. 7.
Inventor:
Lawrence S. Wilbur
By Arthur H. Durand Patented Dec. 2, 1930

1,783,351

UNITED STATES PATENT OFFICE

LAWRENCE S. WILBUR, OF EVANSTON, ILLINOIS

SPLICE BAR OR FISHPLATE

Application filed June 24, 1929. Serial No. 373,286.

This invention relates to rail joints having splice bars or fish plates by which the abutting end portions of the rails are connected together and held in alignment. Also, the invention relates to the production of splice bars or fish plates by reshaping or reforming old splice bars or fish plates. Furthermore, the invention relates more specifically to the production of splice bars for use on old rails which have become worn and distorted by use, or by the pounding of the car wheels and the creeping of the rails.

Generaly stated, the object of the invention is to provide a splice bar or fish plate which is curved or bulged inwardly at its middle portion, leaving the two end portions straight and in exact alignment with each other, and with the said middle portion crowned or humped, whereby said middle portion is of greater fishing height than the said end portions.

It is also an object to provide certain details and features of construction and method steps tending to increase the general efficiency and the desirability of a splice bar of this particular character and of the method of production thereof.

To the foregoing and other useful ends, the invention consists in the matters hereinafter set forth and claimed, and shown in the accompanying drawings, in which—

Fig. 1 is a vertical transverse section of a rail joint having splice bars or fish plates embodying the principles of the invention, being a section, on a larger scale, on line 1—1 in Fig. 2 of the drawings.

Fig. 2 of the drawings is a side elevation, on a smaller scale, of the rail joint shown in Fig. 1 of the drawings.

Fig. 3 is a plan view, on a smaller scale, of the splice bar or fish plate shown in Fig. 2 of the drawings.

Fig. 4 is a similar view, showing a different form of the invention.

Fig. 5 is an end elevation, on a larger scale, of the splice bar shown in Fig. 2 of the drawings.

Fig. 6 is a view similar to Fig. 5, but showing a different form of the invention.

Fig. 7 is a view similar to Fig. 5, but showing a different form of the invention.

As thus illustrated, the invention comprises a pair of old or worn and distorted rails 1 and 2, as shown. Rails of this kind are distorted more at the ends thereof, as their extreme ends become somewhat flattened by the pounding of the car wheels. Due to the pounding of the wheels and creeping of the rails, however, the under sides of the treads of the rails become worn somewhat, and the upper sides of the flanges of the rails also become worn.

Each fish plate or splice bar comprises an upright portion 3 having a head or top portion 4 and having a heel or elbow portion 5 that serves as the foot of the bar or plate. The usual flange 6 extends outwardly and downwardly from the said foot of the splice bar. The middle portion 7 of the splice bar is curved or bulged inwardly, as shown in Fig. 3 of the drawings, leaving the two end portions 8 straight and in exact alignment with each other. In addition, the middle portion 7 is humped or crowned to some extent, so that it is higher than the portions 8, as indicated in Fig. 2 of the drawings and as shown in Fig. 5 of the drawings.

In Fig. 5 of the drawings, the inward bulge or curve of the bar at its middle portion is indicated partly in full lines and partly in dotted lines, thus indicating the cross-sectional contour of the bar at its middle portion.

In Fig. 6 the formation of the bar is similar, but in this case only the top portion of the bar is curved or bulged inwardly. However, it is true that this bar is bulged or curved inwardly at its middle portion, and that its middle portion is bumped or crowned, whereby said middle portion is of greater fishing height than the end portions of the bar.

In Fig. 7, the formation of the bar is similar, but in this case only the lower portion of the bar is bulged or curved inwardly at its middle, leaving the top portion perfectly straight when viewed from above, but with the middle portion humped or crowned, as in the other forms of the invention.

In each form of the invention, therefore, as shown and described, the splice bar or fish plate is curved or bulged inwardly at its middle, and the top of the bar is humped or crowned at its middle portion, while the two end portions of the bar are perfectly straight and in exact alignment with each other. Thus, the bar will accommodate itself more readily to worn and distorted rails, the fishing height being greater at the middle of the bar than at the ends thereof. The bolts 9 can be tightened from time to time, as the fish plates or splice bars become loose, and with the bars formed as shown and described, there will always be a tight and firm engagement at both top and bottom of each splice bar, throughout the length thereof. The three kinds of bars can be used in the same unitary structure or in combination with each other, as one kind of bar can be used on one side of a rail joint and another form of bar can be used on the other side of the same joint, or the different kinds of bars can be used on successive joints in the same general rail structure, depending upon the worn or distorted condition of the rails.

The splice bars or fish plates shown and described can be new bars or they can be old bars reshaped or reformed in the desired manner. In some ways, it is more practicable to produce these bars by reshaping or reforming old bars. If desired, the reshaped or reformed bar can be of greater fishing height throughout its length, as well as at the middle thereof, than the original bar. To get the increased height, the vertical or upright portion of the bar can be reduced in thickness, when the old bar is reshaped or reformed, thus stretching the bar vertically to increase its height. Of course, if the bars are new bars never before used, their upright or vertical portions can be of any suitable or desired thickness, and do not need to be of less thickness than the bar originally used on the old and distorted rails. However, the increasing of the fishing height of the bar, at the middle thereof, or throughout the length thereof, must be obtained by a redistribution of the metal of an old and worn or distorted bar, and while this can be done in various ways, it is possible to do this by simply reducing the thickness of the vertical or upright portion of the old bar.

What I claim as my invention is:

1. In a rail joint, a splice bar or fish plate having an inwardly curved middle portion, and having straight end portions in alignment with each other, said middle portion being humped or crowned.

2. A structure as specified in claim 1, said bar having a lower flange.

3. A structure as specified in claim 1, the bar being curved inwardly as stated at both the top and bottom thereof.

4. A structure as specified in claim 1, said bar having a bottom flange, and this flange being curved with the middle portion of the bar, when the bar is viewed from above.

5. A structure as specified in claim 1, said straight end portions being of uniform fishing height throughout the length thereof.

6. A structure as specified in claim 1, the rails of the joint being distorted at the ends thereof, thereby accommodating said inwardly curved middle portion of the bar, providing top and bottom engagement of the bar throughout the length thereof.

7. A structure as specified in claim 1, said bar being a reshaped or reformed old bar of greater fishing height than the original bar, and the rails of the joint being old rails that have become worn and distorted by use.

8. A rail joint comprising old rails that have become worn or distorted by use, and a splice bar formed from an old bar and of greater fishing height than the original bar, the middle portion of said bar being humped or crowned, whereby the middle portion of the bar is of greater fishing height than the ends thereof.

9. A structure as specified in claim 8, said bar being bulged inwardly at its middle portion.

10. A structure as specified in claim 8, said bar having a bottom flange, and the upright portion of said bar being of less thickness than the original bar.

11. A rail joint comprising old rails that have become worn or distorted by use, and a splice bar thereon of greater fishing height than the bar originally on said joint, said bar being humped or crowned at its middle portion, whereby said middle portion is of greater fishing height than the ends of the bar.

12. A structure as specified in claim 11, said bar being bulged inwardly at its middle portion.

13. A structure as specified in claim 11, said bar having a bottom flange.

Specification signed this 21st day of June, 1929.

LAWRENCE S. WILBUR.